Figures 1, 2:
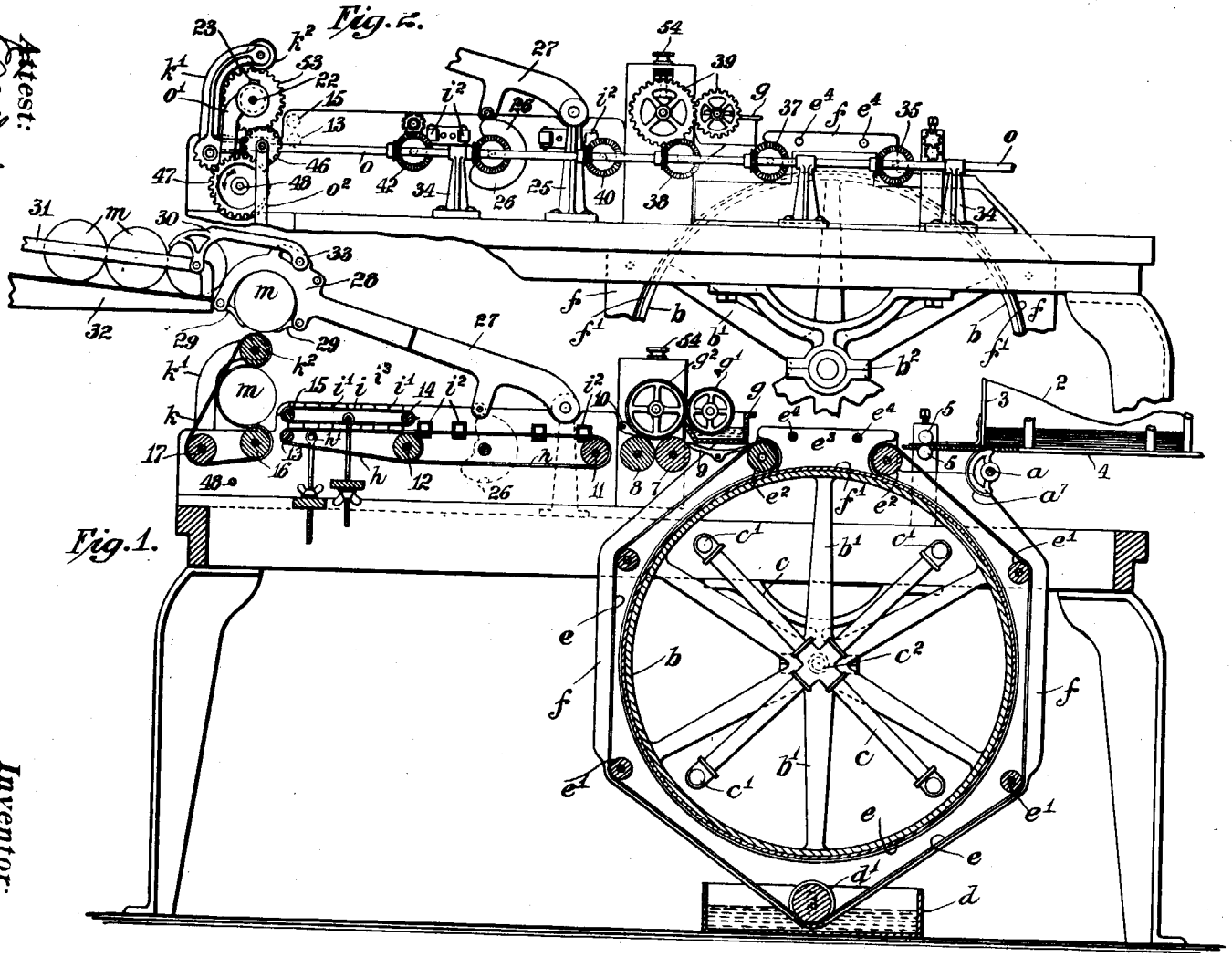

J. C. SHULTS.

CAN LABELING MACHINE.

APPLICATION FILED MAR. 5, 1915.

Reissued June 29, 1915.

13,940.

5 SHEETS—SHEET 1

Attest:

C. Mitchell

J. D. Connolly Jr.

by

Inventor:

James C. Shults,

Edwards, Sager & Wooster

Attys.

J. C. SHULTS.

CAN LABELING MACHINE.

APPLICATION FILED MAR. 5, 1915.

Reissued June 29, 1915.

13,940.

5 SHEETS—SHEET 2.

Attest:

J. D. Mitchell

J. D. Connolly Jr.

Inventor:

James C. Shults, by Edwards, Sager & Webster.

Attys.

J. C. SHULTS.

CAN LABELING MACHINE.

APPLICATION FILED MAR. 5, 1915.

Reissued June 29, 1915.

13,940.

5 SHEETS—SHEET 3.

Attest:
N. D. McKeen
J. D. Connolly Jr.

Inventor:
James C. Shults,
Edwards, Sager & Wooster.
Attys.

J. C. SHULTS.

CAN LABELING MACHINE.

APPLICATION FILED MAR. 5, 1915.

Reissued June 29, 1915.

13,940.

5 SHEETS—SHEET 4.

Attest:
S. B. McKeen
J. D. Connolly Jr.

by

Inventor:
James C. Shults,
Edwards, Sager & Wooster
Attys.

J. C. SHULTS.
CAN LABELING MACHINE.
APPLICATION FILED MAR. 5, 1915.
Reissued June 29, 1915.
13,940.
5 SHEETS—SHEET 5.
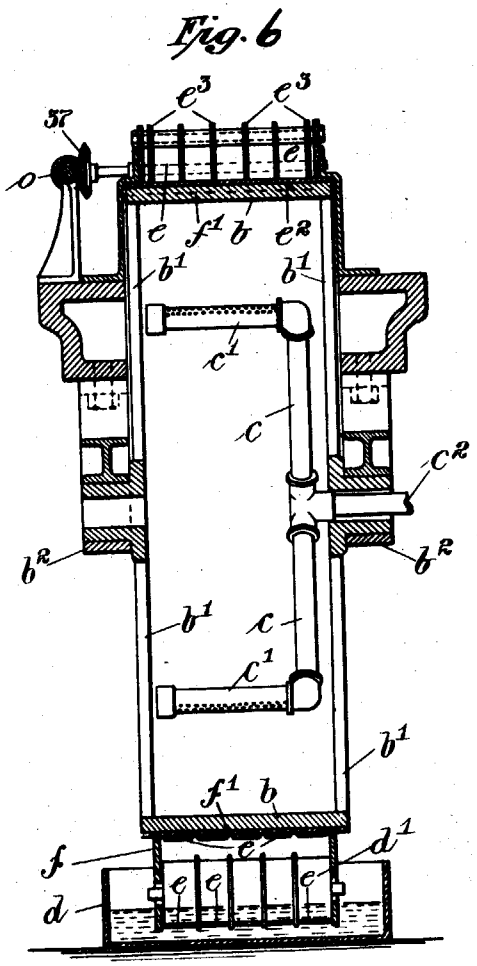
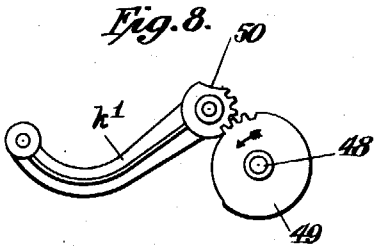
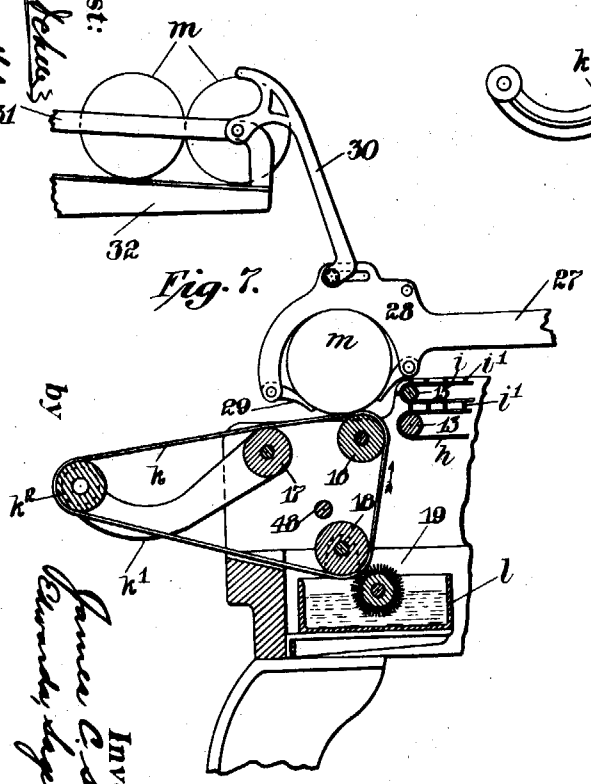
Attest:
E. D. Mitchell
J. D. Connolly Jr.
Inventor:
James C. Shults,
by Edwards, Sager & Webster
Attys.

UNITED STATES PATENT OFFICE.

JAMES C. SHULTS, OF MEADVILLE, PENNSYLVANIA, ASSIGNOR TO RUSS AUTOMATIC LABELING CO., OF NEW YORK, N. Y., A CORPORATION OF DELAWARE.

CAN-LABELING MACHINE.

13,940. Specification of Reissued Letters Patent. Reissued June 29, 1915.

Original No. 1,061,021, dated May 6, 1913, Serial No. 647,428. Renewed August 12, 1912, Serial No. 714,707.
Application for reissue filed March 5, 1915. Serial No. 12,434.

*To all whom it may concern:*

Be it known that I, JAMES C. SHULTS, a citizen of the United States, residing at Meadville, in the county of Crawford and State of Pennsylvania, have invented certain new and useful Improvements in Can-Labeling Machines, of which the following is a full, clear, and exact specification.

My invention relates to improvements in machines for affixing labels to sheet metal cans and similar articles containing canned commodities, articles of food, etc., and the same is designed more especially to smoothly apply labels to receptacles or cans having uneven circumferences. For example, there are many cans used which have the main body of one circumference, a bead of another circumference, and a cover of still another circumference, and which after being filled are sealed by the label. It is desired that the labels lap evenly and also adhere through the length of the lap. Heretofore, such work has only been done by hand, and the object of this invention is to provide a machine wherein the entire work of separating, feeding, moistening, pasting and applying the labels and discharging the labeled cans is accomplished automatically.

In the machine of my improvement, the labels in a superposed pile are placed in a suitable receptacle from which they are removed one at a time. The labels are progressively fed to and through a device.—I designate a humidor—in which the labels are moistened with water and hot vapor. The labels are then progressed to a pasting device, where the unprinted and uppermost surfaces are given a coat of paste or suitable adhesive material and the labels as pasted, forwarded by conveyers to meet the cans. The cans are fed to the machine one at a time and at the end of the feed are engaged at their ends by revoluble yielding clamps. The pasted labels are fed on to an endless apron having a moistened surface and a swinging arm associated with the apron elevates a part thereof encircling the same with the label around the can. As the can revolves, the label is caused to adhere thereto by the pressure of the apron, and the pull of the can on the label. This tension on the label stretches it over the uneven surface of the can. These surfaces have speeds of revolution varying with their diameter, and the label conveyers have bars which positively hold the label against the pull of the can, so that the label is practically pulled by the can itself, and thereby evenly lapped on the can. This stretching of the label is rendered possible by the humidor, as the moisture from the paste cannot always be relied upon to make the label sufficiently soft to stretch. The swinging arm which operates the belt which presses the label on the can moves downward to an initial position after the label is pasted on the can, the clamps are released and the can rolls down the apron and away to a suitable receptacle, the operations as stated, being successively repeated with each can.

The fuller recital of the device and the operations thereof will hereinafter be more particularly set forth.

Figure 3:
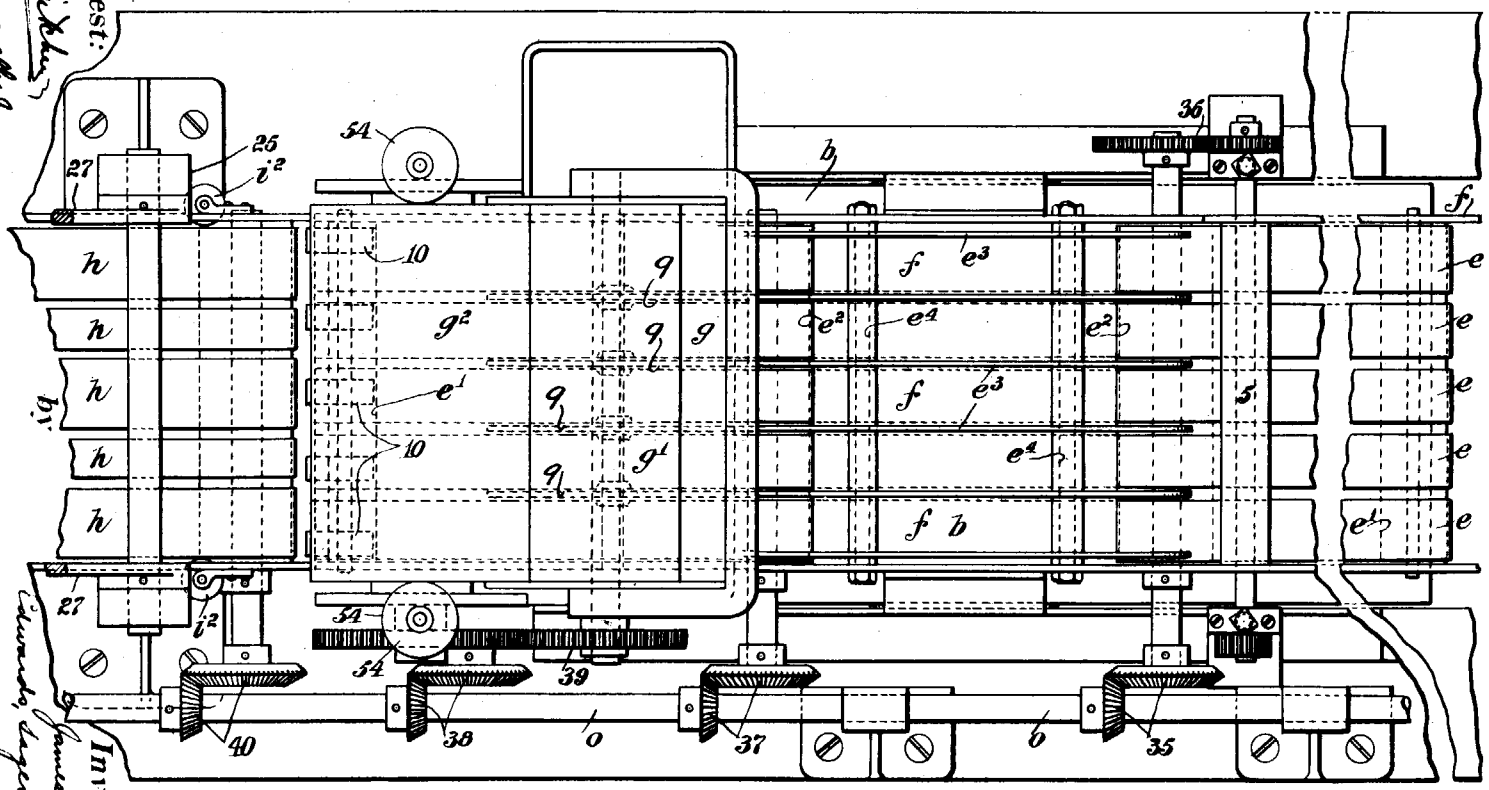
Figure 4:
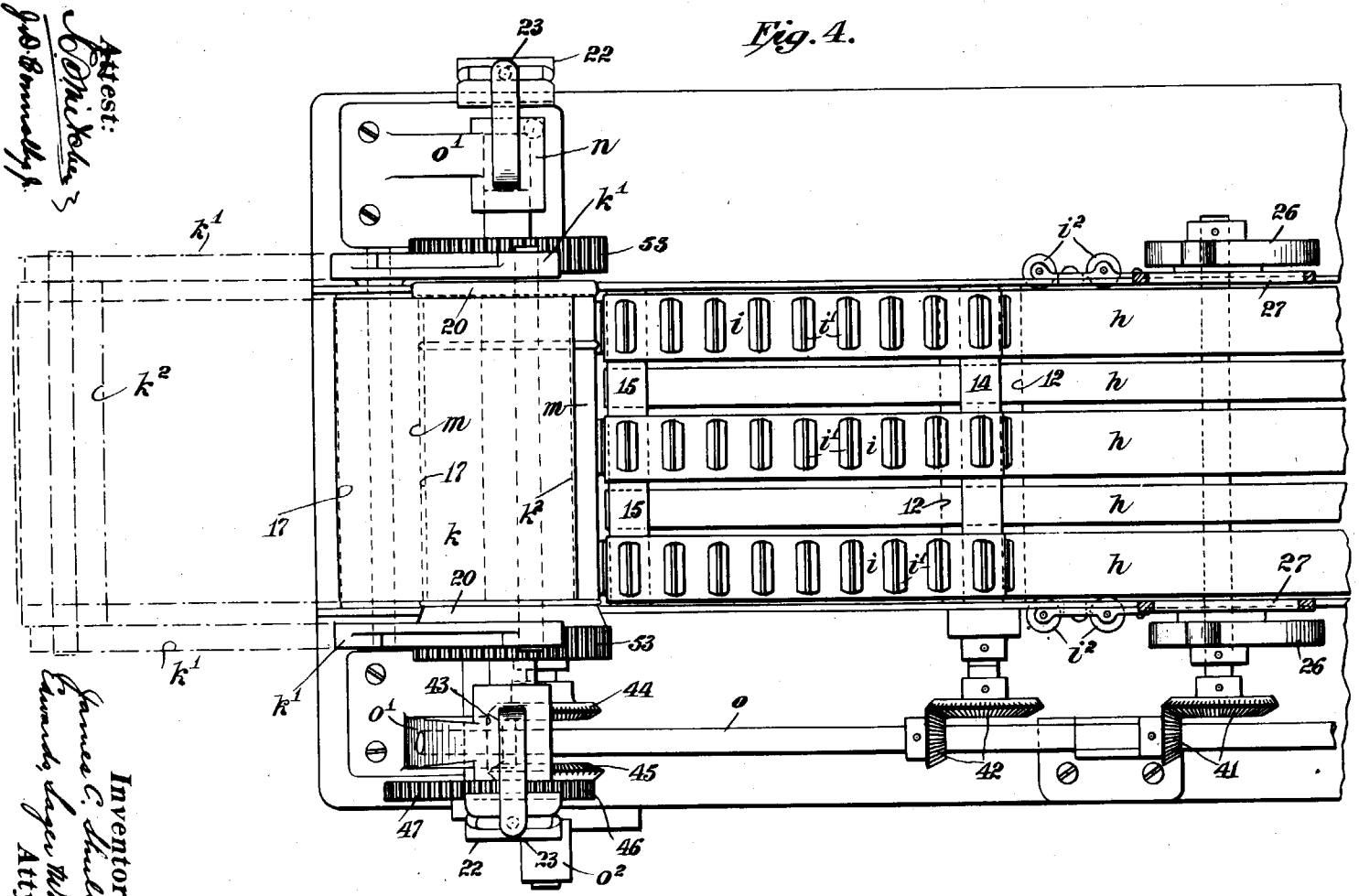
Figure 5:
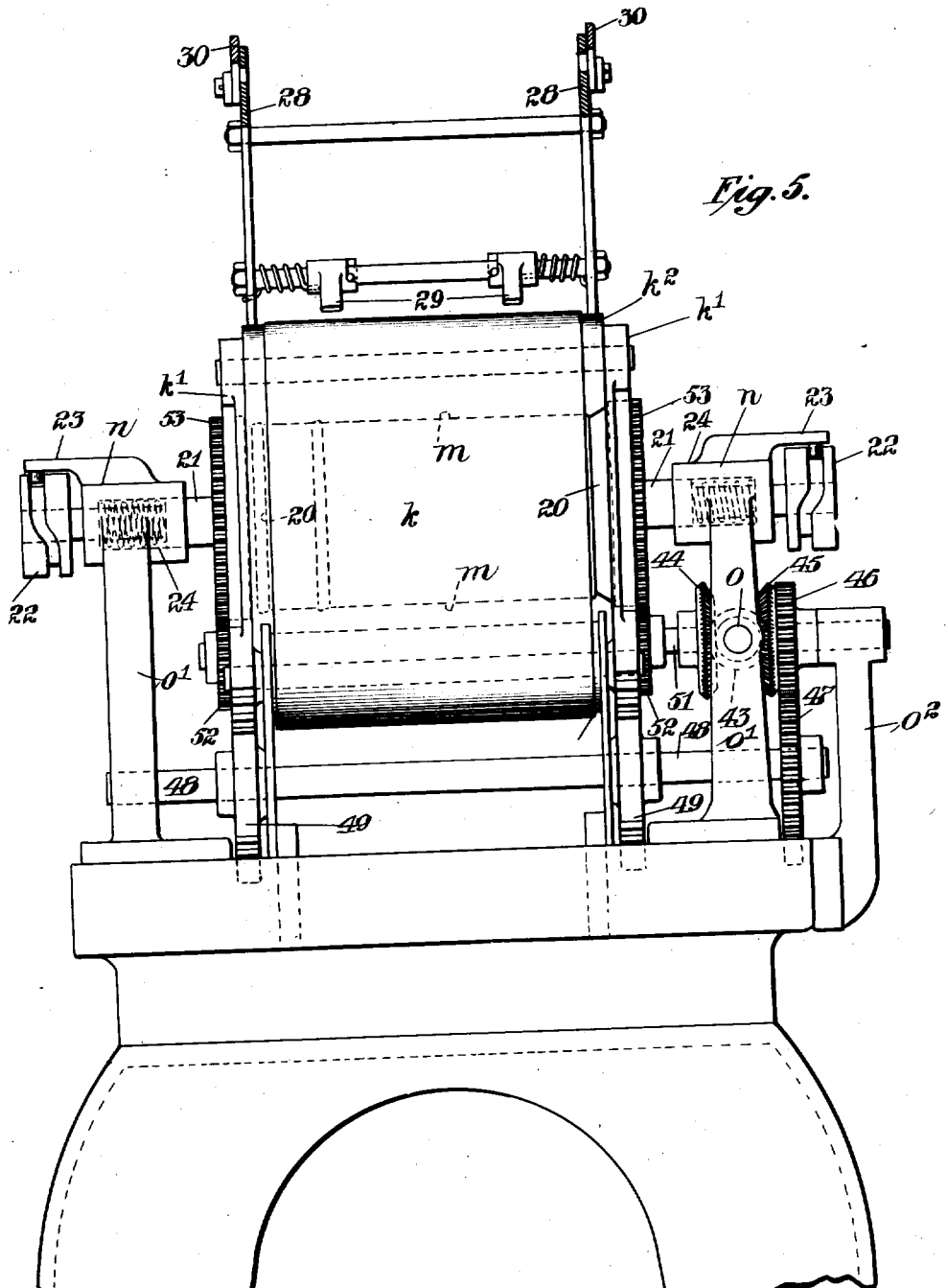

In the drawing, Figure 1 is a diagrammatic longitudinal section representing the essential features of my invention: Fig. 2 is a side elevation especially representing the device for operating the several parts of the machine; Fig. 3 is a plan of the right hand end of the machine of my improvement; Fig. 4 is a plan of the left hand end of the machine of my improvement; Fig. 5 is an elevation at the rear end of the machine; Fig. 6 is a vertical cross section through the machine at the humidor or label moistening device; Fig. 7 is a vertical section representing the preferred form or group of devices for applying the label to the can; Fig. 8 is an elevation showing the intermediate gear devices for raising parts associated with applying the label to the can.

Similar letters and numerals of reference indicate the same parts.

The rectangular open frame is preferably mounted on corner legs, shown especially in Figs. 1 and 2, the same supporting the devices of the entire mechanism, and I prefer to employ a device for holding a pile of superimposed labels, similar to the device shown in the Russ Patent No. 938,897, in which 2 represents a side and 3 an end of the receptacle, 4 represents the bottom of the receptacle and 6 represents pins that are upright and adjustable and which form the substantial equivalent of the other side of the receptacle, stops being provided for the pins.

$a$ represents a shaft in suitable bearings and $a'$ segments on this shaft $a$, which by preference are rubber-faced. The bottom or support 4 for the labels is cut away so as to provide for the operation of the segments $a'$ $a'$. These segments in their rotation with the rotation of the shaft $a$, take hold of the bottom or lowermost label and advance the same out from beneath the pile of superposed labels into the bight of the forwarding rollers 5.

The devices for moistening the labels with water and hot vapor and which I term "a humidor", comprise a wheel or drum $b$ preferably with hollow trunnions and spokes $b'$ from the trunnions to the periphery of the wheel. The trunnions are mounted in bearings $b^2$ and I prefer and have shown pipes $c$ as connected to an X-head extending from a pipe $c^2$ through the trunnions and the pipes $c$ terminating in arms $c'$ which are perforated specially on their outer surfaces. These pipes remain stationary while the wheel or drum rotates around the same, gas being supplied to the said pipes and burning within the drum or wheel at the perforations in the arms $c'$, thereby vaporizing the moisture in belt $f'$.

$d$ represents a tank for water supported from a floor or other convenient support and in the same is a vertically movable weighted roller $d'$.

$e$ represents the endless belts of a series; $e'$ a series of rollers mounted between side inclosing plates $f$, and $e^2$ larger rollers at the upper part. The endless belts $e$ pass around the greater portion of the drum or wheel $b$, over the rollers $e^2$ and outside the rollers $e'$ and under and beneath the weighted roller $d'$ through the water of the tank.

The wheel or drum $b$ has preferably around the same a band of felt $f'$ which comes between the same and the endless belts $e$, and the labels as they are removed progressively from the superposed pile in the receptacle, pass between the rollers 5 over the belts $e$, around the right hand roller $e^2$ and then down between the said belts and the felt covering $f'$ on the wheel $b$, being guided in their movements by a series of vertically disposed guiding blades $e^3$ supported upon the stay-bars $e^4$ and which guide blades are spaced across the surface of the wheel or drum $b$ and its felt cover. The belts $e$ become wet as they pass through the water in the tank $d$ and consequently they thoroughly moisten the felt covering $f$ of said wheel or drum. The heat of the wheel or drum from within, heats the felt so that the moisture thereof is being constantly evaporated in the form of a heated vapor, and as the labels pass between the belts $e$ and the felt belt $f'$ on the surface of the roller, they are not only thoroughly moistened but considerably heated. However they are not moistened sufficiently to be so saturated as thereafter to drop any water in their movement through the machine. The labels pass almost entirely around the wheel or drum in transit and on the opposite side are guided by the blades $e^3$ over the left-hand roller $e^2$ and into the pasting mechanism. Adjacent the humidor is located a paste or adhesive material holder $g$ in the form of a trough, in which is located a roller $g'$. By its revolution, this roller $g'$ lifts out of the trough on its surface the paste or adhesive material. A distributing roller $g^2$ running in contact with the roller $g'$ and in the opposite direction thereto, removes the paste or adhesive material at least to a required extent from the surface of the roller $g^2$, and the labels as they pass over the left-hand roller $e^2$ and the belts thereon, are lifted by the switch wires 9 and directed toward the rollers 7, 8, the labels then passing between the rollers 7, 8, and the pasted surface of the distributing roller $g^2$ and the upper and unprinted surface of the label then receives a coat of paste or other adhesive material. The switch fingers 10 prevent the labels passing farther upon the surface of the distributing roller $g^2$ and direct the said labels forward on to the endless conveyer $h$ which is composed of several belts. These belts pass around the rollers 11 and 13 and over the opposite faces of the rollers 12. Associated with the endless conveyer $h$ is an auxiliary conveyer composed of belts $i$ mounted on the rollers 14, 15, and the belts of which are provided with the alining metal ribs $i'$ having plate bases riveted to the belts. These ribs bear either upon the outer surfaces of the several belts $h$ or upon the surfaces of the labels and tend to regulate and evenly progress such pasted labels, and in this connection I employ guide rollers $i^2$ at one or both sides of the outer of the belts $h$ for the purpose of shifting and straightening the labels upon the conveyer belts so that they run regularly and true.

I have shown and prefer to employ a tension roller $h'$ adjacent to the rollers 13 and which tension roller is provided with suitable supports and adapted to bear upwardly against the upper parts of the conveyer belts $h$ so as to press the same toward the auxiliary belts $i$. It is preferable to employ a nut for raising and lowering the tension rollers, and I prefer to employ a separate tension roller under each of the belts $h$ so that tension to the desired extent may be had on any of the belts independent of the others. I also employ tension rollers $i^3$ to draw the belts $i$ toward the belts $h$.

It will be noticed that the conveyer belts, the ribs on the auxiliary belts and the tension rollers come closely adjacent to the delivery end where the pasted label is placed upon the can, and as these cans are of more or less uneven surface because of the ribs and the edge of the cover or lid, more tension is required on the side of the label that goes over the lid and bead than on the other side, so as to appreciably stretch this edge of the label, whereby when the entire label is on the can the edges of the label lap-up even and parallel. The required tension is effected by the action of the ribs $i'$ on belts $i$ coöperating with belts $h$ to positively grip the rear portion of the moistened label, while the forward portion between the can and the belt $k$ is pulled by the revolution of the can and the belt $k$. The moistened label yields at the places where the most tension is applied, which is of course at points of larger diameter on the can, and this action is progressive as the can revolves. By adjusting the rollers $h'$ and $i^3$, more or less tension is applied to the belts $h$ and $i$, and thereby the bite of the ribs $i'$ on the pasted and moistened labels on belts $h$ controlled, thereby holding the labels and retarding their free discharge from the support of these belts $h$ to the bite of the apron $k$ and the can being labeled.

The devices for wrapping the label on the can and for supplying the cans one at a time to said devices, consist of the following parts:—An endless apron $k$ passes around rollers 16, 17 and 18, Fig. 7, the roller 18 being just above the water in the tank. A brush roller 19 is employed in the tank and provided with means for rotating the same in a direction opposite to the rotation of the roller 18, for the purpose of continuously wetting the surface of the apron $k$ and removing from the surface of the apron or belts any free paste that may have been delivered thereon and squeezed out from between the label and the can as the label is pasted on the can, and so washing the apron that when the apron leaves the tank of water, it leaves the same clean without any paste or other particles. A pair of swinging arms $k'$ are upon the shaft of the roller 17 and their free ends carry a roller $k^2$ around which the apron also passes.

I provide heads 20 adapted to come against the respective ends of the can; these heads are formed with spindles 21 passing through suitable bearings $n$. Each spindle is provided with a cam 22 and there is an adjacent fixed arm 23 having a pin acting in the groove of said cam for moving the said spindles and heads, one or both, in opposite directions, so as to open and close the distance between the heads to receive the cans as delivered, and thereafter to release the same. In each bearing $n$, around the spindle 21, is a spring 24, serving to make steady the movement of the spindles in pressing the heads against the ends of the cans to hold the same tight and in taking up any lost motion. The arms 23 are fixed upon or formed with the bearings for the shaft 21 on the upper ends of standards $o'$.

I provide one or more standards 25 and one or more arms 27 pivoted thereto. Each arm 27 has a projection and roller, which latter bears upon the surface of the cam 26 provided for raising and lowering the arms 27. Upon the free ends of the arms 27 are heads 28, concave on the under sides to a slightly greater area than that of the can, and the lower parts of these heads, on the inner faces, are provided with spring dogs 29, for supporting the can at its opposite ends.

I provide a swinging arm 30 pivoted to guide arms 31 secured to an inclined platform 32 down which the cans to be labeled descend by gravity. This arm 30 is also pivotally connected to the head 28 by a sliding pivot 23—that is a pivot sliding or moving in a slot in the top of the head.

A power shaft $o$ runs along one side of the machine and is mounted in suitable bearings in the upper ends of the standards 34, and I provide a pair of bevel gears 35 for operating the right hand roller $e^2$, and line gears 36 for actuating the rollers 5. I also provide bevel gears 37 for actuating the left hand rollers $e^2$ whereby motion is communicated through the rollers $e^2$ to the endless belts $e$ and therefrom to the wheel or drum $b$ for the operation of moving the labels one at a time through the humidor. I also provide bevel gears 38 adapted for actuating the line gears 39 and the pasting rollers $g'$, $g^2$. Bevel gears 40 communicate motion to the roller 11 and therefrom to the endless conveyer belts $h$ while bevel gears 42 also communicate motion to the rollers 12 and 14 of the belts $h$ and auxiliary belts $i$. Bevel gears 41 are employed to transmit rotation from the power shaft $o$ to the cam 26, so as to operate the arm 27 and the cam actuating devices.

In connection with forwarding the labels as pasted over the endless conveyer belts $h$, I have shown and prefer to employ series of guide rollers $i^2$ which serve while the pasted labels are lying loose and free on the belts $h$, to straighten the same if the edges are out of true right angle with the line of travel.

At the end of the power shaft $o$ there are standards $o'$ and on the end of the power shaft there is a pinion 43, meshing with the bevel gears 44 and 45. The bevel gear 44 is on the shaft 51 and the bevel gear 45 is on the shaft $46^a$ in a standard $o^2$.

On the shaft 48, in bearings in the standards $o'$, there is a gear 47 meshing with the gear 46, and also intermittent gears 49.

I have shown in Figs. 2, 7 and 8, on the revoluble parts, arrows which show the direction of rotation. Fig. 8 shows one of these intermittent gears 49 as containing a few teeth and a plain radial surface, and also in Fig. 8 one of the arms $k'$ and the hub end of said arm which contains teeth and a concave surface 50, the teeth being in mesh with the teeth of the intermittent gears 49; therefore as the gears 49 are rotated by their shaft 48 through the medium of the gear 47, the gear 46, bevel gear 45 and the conical pinion 43, these intermittent gears turn in the direction of the arrow and raise the arms $k'$, elevating the same into the position of said arms shown in Fig. 2, and when in this position, the concave surfaces 50 of their hubs,—the arc of which agrees with the arc of the surface of the intermittent gears 49,—holds the arms $k'$ in the elevated position until the intermittent gears 49 come around to their reduced diameter, at which point the arms $k'$ are permitted to fall into the position shown in Fig. 7, at which time, in the timing of the movements of the machine, the cans have been labeled and are prepared to roll down the belt $k$ to a suitable receptacle.

On the shaft 51 to which rotation is imparted by the shaft $o$, through the conical pinion 43 and the bevel gear 44, there are connected gears 52 and on the shaft 21 there are the large gears 53 meshing with the gears 52 and receiving their rotation therefrom. The heads 20 between which the cans to be labeled are clamped, are also connected upon these shafts or spindles 21 so that rotation is imparted to the cans as labeled, by the gears 53 and 52, and the shaft 51.

In the further operation of the device and with special reference to Fig. 7, as the arms 27 are moved up and down by the cam 26, the swinging arm 30 is moved downward into the position shown in Fig. 7 and its curved left hand end partially encircles the foremost can on the platform 32 and keeps the same in position while the grip of the said arm 27 and its head 28 upon the can held thereby, brings said can down into the true position between the heads 20 where the can is clamped, and in the timing of the parts, at once the can is clamped, the arm 27 and head 28 are quickly raised and the spring dogs 29 yield over the surface of the can as held, and as the arm 27 and head 28 again come up into the position shown in Fig. 1, the arm 30 at its left hand end, releases the advancing can and the same rolls down into the head 28 supported by the spring dogs 29; the left hand end of the arm meanwhile bears against the second can so as to prevent the same rolling forward until the next downward movement of the parts in repeating the operations.

I have shown at 54 in connection with the distributing roller $g^2$ and its gear 39, means for adjusting the position of this distributing roller with reference to the several parts associated therewith.

In the further operation of the device of my improvement, the swinging arm 30, as in Figs. 1 and 7, controls the can at the end of the inclined platform 32, preventing the same shifting as the can-holding devices move down to deliver a can and rise empty. The heads 28, at the end of the arm or arms 27, are slightly wider apart than the length of the can to be labeled, consequently, the cans come between them. In the position Fig. 7, the heads 20 engage the ends of the can and hold the same tight, and as the heads 28 rise, the dogs 29 over-run the can, and then spring into place ready to receive the next can, which is released from the platform 32, as soon as the arm 30 assumes the position Fig. 1, with the free bent end against the next advancing can. These spring dogs 29 are sufficient to hold the weight of each can. The heads 28 must be concave, as shown, to permit of the heads 20 coming up to and engaging the ends of the can. The apron $k$, with the pasted label thereon, is moved from the position Fig. 7 to the position Fig. 1, as soon as the can has been engaged by the heads 20.

Having thus described my invention, I declare that what I claim as new and desire to secure by Letters Patent, is:—

1. In a can labeling machine, devices for forwarding labels one at a time, devices for moistening the labels, devices for pasting the labels, devices for gripping and moving the pasted labels, devices for receiving, holding and revolving cans to be labeled one at a time, and means coöperating with the revolving can to wrap the pasted label around the can and simultaneously stretch it.

2. In a can labeling machine, devices for forwarding labels one at a time, devices for moistening the labels, devices for pasting the labels, devices for gripping and moving the pasted labels, devices for receiving, holding and revolving cans to be labeled one at a time, and means comprising an apron movable bodily to partially embrace the revolving can to wrap the pasted label around the can and simultaneously stretch it.

3. In a can labeling machine, devices for forwarding labels one at a time, devices for moistening the labels, devices for pasting the labels, means for straightening the pasted labels, devices for gripping and moving the pasted labels, devices for receiving, holding and revolving cans to be labeled one at a time, and means coöperating with the revolving can to wrap the pasted label around the can and simultaneously stretch it.

4. In a can labeling machine, devices for forwarding labels one at a time, devices for moistening the labels, devices for pasting the labels, means comprising a supporting conveyer and a coöperating ribbed conveyer for gripping and moving the pasted labels, devices for receiving, holding and revolving cans to be labeled one at a time, and means coöperating with the revolving can to wrap the pasted label around the can and simultaneously stretch it.

5. In a can labeling machine, devices for forwarding labels one at a time, devices for moistening the labels, devices for pasting the labels, devices for gripping and moving the pasted labels, devices for receiving, holding and revolving cans to be labeled one at a time, and a swinging traveling apron movable bodily in one direction to partially embrace the revolving can to wrap the pasted label around the can and simultaneously stretch it, and movable in the other direction to permit discharge of the labeled can by gravity.

6. In a can labeling machine, the combination with means for forwarding labels, of a heated drum, a belt extending substantially around said drum, means for wetting said belt, means for delivering the labels between said belt and drum to be moistened, means for stripping the moistened labels from between said belt and drum, means for pasting the moistened labels, conveyer means for receiving and gripping the pasted labels, can feeding and revolving mechanism, and means coöperating with the revolving can to wrap the pasted label around the can while stretching the portion of the label between the can and said gripping means.

7. In a can labeling machine, means for forwarding the labels one at a time, a drum, a felt strip around the periphery of said drum, means whereby the drum and the felt covering are heated, a tank for water beneath the drum, a vertically movable weighted roller in said tank, rollers adjacent the upper part of said drum and spaced apart, a series of guide blades between the latter rollers extending over the drum and its felt covering, and a series of endless belts passing around said rollers and through said tank with their inner portions in contact with the felt covering of the drum, whereby the felt covering is moistened and heated and the endless belts are moistened and labels passed between the moistened belts and the moistened and heated felt covering for preparing the labels for the pasting operation.

8. In a can labeling machine, the combination with means for moistening the labels one at a time, of a receptacle for adhesive material such as paste, a roller therein, a distributing roller receiving the paste from the aforesaid roller, label supporting means beneath the distributing roller but out of close contact therewith, switch devices for receiving the moistened labels from the moistening devices and directing their path to the paste distributing roller, and other switch devices for removing the labels as pasted from the paste distributing roller and diverting their path of travel.

9. In a can labeling machine, the combination with means for applying adhesive material to the surface of the labels and diverting their path of travel, of a series of endless conveyer belts, rollers around which the same pass, a series of superposed auxiliary conveyer belts, strips of metal forming ribs secured to the said auxiliary conveyer belts across the same at right angles to their length and adapted to bear upon the endless conveyer belts for gripping the pasted labels and evening the same in transit, and means for applying pressure or tension to any one or a number of the endless conveyer belts as against the auxiliary belts and their ribs, whereby the pasted labels may be held in the desired places, and means co-acting therewith for applying and stretching the labels around the cans.

10. In a can labeling machine, the combination with a series of conveyer belts for forwarding the pasted labels, of devices for progressing the cans to receive the labels, devices for engaging the cans at their respective ends and holding and rotating the same, an endless belt or apron, receiving the pasted labels one at a time as forwarded, and suitable rollers upon which the same is mounted and devices connected with said apron and operated at predetermined intervals for moving the apron and one of the rollers and causing the same to be elevated and embrace a part of the revolving can so that the label is partly wrapped around the can as pasted thereto.

11. In a can labeling machine, the combination with a series of conveyer belts for forwarding the pasted labels, of devices for progressing the cans to receive the labels, devices for engaging the cans at their respective ends and holding and rotating the same, an endless belt or apron receiving the pasted labels one at a time as forwarded, and suitable rollers upon which the same is mounted, devices connected with said apron and operated at predetermined intervals for moving the apron and causing the same to embrace a part of the revolving can so that the label is partly wrapped around the can as pasted thereto, and means for returning the apron to its initial position, whereby a part of the same in an inclined plane, forms a delivery for the can as labeled and released.

12. In a can labeling machine, the combination with means for engaging and rotating a can to be labeled, of means coöperating with the rotating can to press the label thereon, and coöperating conveyers for gripping and feeding the pasted label, the conveyer on the pasted side of the label being transversely corrugated.

13. In a can labeling machine, the combination with endless conveyer belts for forwarding the pasted labels and devices for holding the can to be labeled, of an endless apron, rollers around which the same extends, a tank for water and a brush roller in said tank for moistening the surface of the endless apron and for washing therefrom any surplus paste.

14. In a can labeling machine, the combination with means for forwarding the pasted labels and devices for holding the can to be labeled, of a label applying apron, a tank for water and a brush roller in said tank for moistening the surface of the apron and for washing therefrom any surplus paste, and means for raising the apron so as to cause the same to partially encircle the can to be labeled to wrap and press the label around the can.

15. In a can labeling machine, an inclined platform down which the cans to be labeled are delivered, a swinging arm and a head at the free end of said arm, a device pivotally mounted to said head and also pivotally mounted to a part of said inclined platform, and spring actuated can supporting devices connected to said head, whereby the cans one at a time are received from the said platform in said head and the cans on the platform restrained in their movement, rotating devices for receiving the cans from said head in its lowest position and holding the same, and means for controlling said rotating devices to clamp and release the cans.

16. In a can labeling machine, the combination with means for feeding adhesive labels and applying them to cans, of a vibratory arm, a head upon the free end of said arm adapted to receive a can to be labeled, means connected with said head for carrying the can, a platform down which the cans descend to be labeled, and means whereby when the head moves in one direction carrying a can, the remaining cans are held stationary on said platform, and when said head returns to a predetermined position the first can is released to roll into the head and simultaneously hold back the second can.

17. In a can labeling machine, means for feeding and pasting a label, means for gripping and feeding the pasted label, means for feeding and rotating the can, and means for receiving the pasted label from said feeding means and applying it to the rotating can whereby to stretch the label between the rotating can and said gripping means while it is being wrapped around the can.

18. In a can labeling machine, means comprising a plurality of successively released clamping devices for feeding an adhesive label to a can, means for rotating the can, and means for receiving the label from said clamping devices and applying it to the rotating can whereby to stretch the label between the can and the said clamping devices as it is wrapped around the can.

19. The combination with means for feeding and pasting labels, of a support for cans, rotatably driven can clamping heads, means for taking cans one by one from said can support and inserting them between said rotatable heads in position to be labeled, means for engaging said heads with said cans and rotating the cans, and means for feeding detached labels to said rotating cans and applying them thereto, said feeding means holding the label against the pull of the rotating can to effect stretching of the label over inequalities of the can.

In testimony whereof I affix my signature in presence of two witnesses.

JAMES C. SHULTS

Witnesses:
W. L. ORRIS,
EARLE C. HUIDEKOFER.

Copies of this patent may be obtained for five cents each, by addressing the "Commissioner of Patents, Washington, D. C."